United States Patent Office 3,429,662
Patented Feb. 25, 1969

3,429,662
ZINC OXIDE
Otto C. Klein, Collinsville, Ill., and Gilbert E. Mason, Columbus, Ohio, assignors to American Zinc Company, St. Louis, Mo., a corporation of Maine
No Drawing. Filed Mar. 15, 1965, Ser. No. 440,000
U.S. Cl. 23—148                           5 Claims
Int. Cl. C01g 3/02, 9/02; G03g 7/00

ABSTRACT OF THE DISCLOSURE

French process zinc oxide is heated in a flowing stream of air and water vapor in a time-temperature range of between about 5 minutes at 700° C. and 4 hours at 200° C., to produce zinc oxide with a dispersed water absorption, as defined in the specification, under 300 ml., uniform within each lot within plus or minus 15, particularly suited for aqueous photoconductive coating compositions.

Background of the invention

This invention relates to the treatment of French process zinc oxide and to a resulting zinc oxide which is particularly suited for the manufacture of aqueous electrophotographic coating compositions.

It is known that various types of zinc oxide produced by several different processes have been calcined in the presence of various reducing or oxidizing atmospheres to remove impurities or to increase the particle size (see, for example, U.S. Patents to Cyr et al., 2,941,862, Pearlman, 2,147,377, Breyer et al., 1,664,767, Booge, 1,425,349, Bartlett, 406,868). Steam has been used to aid in the removal of water-soluble impurities from American process oxide used in the compounding of rubber. (Cyr et al., 2,941,862, supra.)

It is also known that photoconductive zinc oxide can be employed in solvent or aqueous electrographic coatings with a composition consisting of finely-divided photoconductive zinc oxide suspended in various resinous vehicles containing appropriate dispersing, wetting and sensitizing agents. When the coatings are dried, the resinous vehicles form an electrically insulating binder for the photoconductor. Usually these photoconductive compositions are coated on a paper substrate which has been previously treated to produce a uniformly electrically conducting or semiconducting substrate.

Photoconductive zinc oxides produced heretofore have varied widely in some physical and electrical properties. For example, the large variation in the water absorption of dispersed zinc oxides known heretofore has made it impossible to maintain uniform viscosity in producing aqueous electrophotographic coatings without changing the amount of water even from small batch to small batch. Most photoconductive zinc oxides available commercially are known to contain as much as 40% agglomerates, some of which are loosely bound, while others are fused together. The particle size distribution also varies, especially in the amount of very fine particles. In addition, varying surface conditions have had considerable effect on dispersed water absorption. These factors have resulted in photoconductive zinc oxides with widely varying, but generally high dispersed water absorptions, measured by the procedure outlined as follows:

Weigh out 200 grams of zinc oxide. Add 150 ml. of water to an Osterizer (blender) and start the Osterizer at low speed (approx. 8,000 r.p.m.), adding the zinc oxide slowly until the slurry stops moving due to the formulation of an air pocket at the blade assembly. Release air with a spatula, add 10 ml. of water, and then continue the addition of zinc oxide until the slurry again stops moving. Repeat the process of adding 10 ml. increments of water and additional zinc oxide until all the oxide is in the blender. The dispersion must continue for ten minutes without the formation of an air pocket, otherwise, enough water is added for complete dispersion. The total amount of water required for the final zinc oxide dispersion is called the dispersed water absorption value. Thus, a dispersed water absorption value of 250 indicates that 250 ml. of water were required to disperse 200 grams of the zinc oxide. The dispersed water absorption value of various types of zinc oxides have been checked successfully by three operators using the above-described method with an accuracy of ±10 ml. of water.

Photoconductive zinc oxides produced heretofore have contained a very small amount of entrained metallic zinc particles. The particles of zinc are for the most part entrained in particle agglomerates and are not in the crystal lattice. These small zinc particles can be detected by colorimetric procedures and have been separated from the zinc oxide by flotation methods. As the metallic zinc particles are very conductive electrically, they can reduce the photoconductivity of the zinc oxide.

Before present commercial photoconductive zinc oxides can be incorporated into either solvent or aqueous electrophotographic coatings, a considerable amount of pretesting is required prior to each particular application. As noted above, this is caused by wide variations in dispersed water absorption, by the entrainment of small amounts of metallic zinc, by variations in the percentage of very fine particles, and by variations in surface conditions—such as the amount of chemisorbed oxygen.

It is an object of this invention to produce a photoconductive zinc oxide which, when incorporated into an electrophotographic coating composition and applied to a recording member, increases and renders more uniform the photoconductive properties of the member when measured by the normal criteria of maximum charge acceptance, dark and light decay and residual voltage.

Another object of this invention is to provide a photoconductive zinc oxide of lower and controlled dispersed water absorption values as compared with zinc oxide known heretofore.

Another object of this invention is to provide a photoconductive zinc oxide which can readily be dispersed in aqueous electrophotographic coating compositions.

A further object of this invention is to provide a photoconductive zinc oxide in which entrained metallic zinc particles are oxidized and the chemisorbed oxygen on the surface of the zinc oxide particles is maintained or increased.

Another object of the invention is to provide a photoconductive zinc oxide which contains a minimum of very fine and very coarse particles, in which the usual particle size distribution has been altered, and which can be supplied in a powdered, densified or pellitized form.

Statement of the invention

In accordance with this invention generally stated, high purity French process zinc oxide is treated in a suitable furnace at a temperature in the range of 200° C. to 7000° C. in the presence of steam and in an oxidizing atmosphere, usually air or oxygen, for a period of from about four hours at the lowest temperature to about five minutes at the highest.

By variations in the equipment used, and by the regulation of retention time, temperature, and the amount and composition of sweeping gases, specific characteristics can be imparted to the photoconductive zinc oxide. Such improved photoconductive zinc oxides may be provided with specified dispersed water absorption values ranging from 200 to 400 ml. water per 200 grams of zinc oxide. In a commercial lot of six to twelve thousand pounds, the dispersed water absorption for any bag can be within ±15 of the specified dispersed water absorption value.

In the preparation of aqueous electrophotographic coating compositions it is very desirable that the photoconductive zinc oxide have a consistent dispersed water absorption and that this water absorption be as low as possible, consistent with good dispersion of the oxide. It has been found that photoconductive zinc oxides in the particle size range of 0.20 to 0.45 micron average diameter and produced from French furnaces can and commonly do have dispersed water absorption values varying from 300 to 500. Individual bags of oxide within a single lot of six to twelve thousand pounds often have values which vary by 50 or 60 from the average dispersed water absorption value for the lot. Photoconductive zinc oxides with these widely varying dispersed water absorption values can be leveled out at 260±15 in accordance with this invention, by calcining the photoconductive zinc oxide at a temperature of 400° C. in the presence of a flowing mixture of steam and air or oxygen and with a retention time of thirty minutes. It has been found that a dispersed water absorption value of approximately 260 is preferred for easy incorporation of the zinc oxide into many aqueous or solvent electrophotographic coatings and for optimum hiding power of the zinc oxide in these electrophotographic coatings. However, photoconductive zinc oxide can be produced with consistent dispersed water absorption values (within ±15) throughout the range of 200 to 400 by selection of the proper calcining temperature and retention times.

Electron photomicrographs have shown that the ultrafine zinc oxide particles in photoconductive French process zinc oxides are completely eliminated or greatly reduced, depending on the treatment temperature and retention time, by the process of this invention without shifting the entire particle distribution toward the coarse end to an undesirable degree. By the removal of these ultra-fines, which are not photosensitive to the light wave lengths normally used for the exposure, the recording members produced from the treated photoconductive zinc oxide give prints with much better definition and with a decrease in exposure time.

As has been stated, an oxidizing atmosphere containing water must be used, a flow of oxidizing gases and steam is used during the process of this invention and the zinc oxide particles are preferably agitated during the treatment. When the oxide is treated in a rotary kiln, it is preferable to spray water on the kiln walls, so that steam is generated in or near the zinc oxide being treated. It is to be noted that the process of this invention has application only to French process zinc oxide. The process is inoperative to produce the desired results with American process zinc oxide, and the product resulting from the use of the process with American process zinc oxide is worthless for the intended purposes of photoconductive zinc oxide.

In the examples set forth hereinafter the average particle diameter in microns was determined by the reactivity method, in which a weighed sample of zinc oxide is reacted with a weighed amount of tartaric acid solution and the rate of temperature increase of the mixture is carefully measured.

The brightness of each zinc oxide was determined by making a paste with linseed oil, using conventional techniques. The color of this paste was then compared with a similar paste made with a zinc oxide of known brightness.

To determine the electrical characteristics of the photoconductive zinc oxide produced by the method of this invention, the processed zinc oxides were incorporated into two solvent and one aqueous electrophotographic coatings, and the recording members produced from the coatings were tested by normal criteria of maximum charge acceptance, light and dark decay and residual voltage. The following electrophotographic coating systems were used.

(I) Pliolite S–5B resin solvent electrophotographic coating:

| | Grams |
|---|---|
| Pliolite S–5B | 25 |
| Xylene | 115 |
| Photoconductive zinc oxide | 200 |

The Pliolite S–5B was manufactured by the Goodyear Tire and Rubber Company, Akron, Ohio. After dissolving the Pliolite S–5B in the xylene, the solution was put into a milling jar. Two hundred grams of the processed photoconductive zinc oxide was added to the milling jar, and the constituents were ball milled for three hours. The coating was then applied to a standard treated paper substrate.

(II) Alkyd 72–64B resin solvent electrophotographic coating:

| | Grams |
|---|---|
| Alkyl 72–64B | [1] 42 |
| Toluene | 30 |
| Photoconductive zinc oxide | 200 |

[1] 6.20% solids.

The Alkyd 72–64B was manufactured by DeSoto Chemical Coatings Company, Chicago, Ill.

These materials were dispersed for three to five hours in a steel ball mill, using ⅜-inch steel balls as the dispersing medium. The coating was then applied to commercial paper substrate supplied by the West Virginia Pulp and Paper Company.

(III) Piccotex–100 resin aqueous electrophotographic coating:

| | | |
|---|---|---|
| Gelatin (USP powdered) | grams | 1.33 |
| 1,4 Butanediol | ml. | 2 |
| Distilled water | ml. | 97 |
| Photoconductive zinc oxide | grams | 200 |

Piccotex is manufactured by Pennsylvania Industrial Chemicals Company, Clairton, Pa.

The first three materials were heated until a clear solution formed. It was then cooled to room temperature. The photoconductive zinc oxide was slowly added to the gelatin solution while dispersing at low speed in an Osterizer (blender). After approximately two minutes of dispersing, the materials were emptied into a steel milling jar. Ten grams of Parez 613, American Cyanamid Company, was stirred into the partially dispersed zinc oxide slurry.

Twenty-five grams of Piccotex–100 was powdered and then stirred into the zinc oxide slurry. All of the constiutents were milled for one and one-half hours with 400 grams of ⅜-inch steel balls. The aqueous coating was applied to a treated paper substrate, and the coated substrate dried in an oven at a temperature of 115° C.

The following examples of various treatments for photoconductive zinc oxide are given for illustrative purposes, and it will be understood that the invention is not limited to these examples.

EXAMPLE NO. 1

Fifty pounds of photoconductive French process zinc oxide, AZO–ZZZ–661 Lot 3–5679, American Zinc Sales Company, Columbus, Ohio, was treated in an externally-heated stainless steel rotary kiln under the following conditions:

| | |
|---|---|
| Kiln temperature | 400° C. |
| Kiln r.p.m. | 15. |
| Air flow | Approx. 50 c.f.m. |
| Water vapor | Sufficient to saturate air at 70° F. |
| Return time | 30 minutes. |

The treated and untreated photoconductive zinc oxides had the following physical characteristics:

| Physical characteristics | Untreated ZnO | Treated ZnO |
|---|---|---|
| Particle size, microns | .319 | .358 |
| Brightness | 87.5 | 86.5 |
| Dispersed water absorption | 390 | 260 |
| Bulk density, lb. per cu. ft. | 22.37 | 40.77 |

The treated zinc oxide showed an increase in density, and a portion of the product was pelletized. The superior electrical characteristics of this photoconductive zinc oxide in aqueous and solvent electrophotographic recording members are illustrated in Table I.

EXAMPLE NO. 2

Fifty pounds of French process photoconductive zinc oxide, AZO-ZZZ-661, Lot 3-5679, was treated in an externally-heated stainless steel rotary kiln under the following conditions:

| | |
|---|---|
| Kiln temperature | 250° C. |
| Kiln r.p.m. | 15. |
| Air flow | Approx. 50 c.f.m. |
| Water vapor | Sufficient to saturate air at 70° F. |
| Retention time | 240 minutes. |

The treated and untrated photoconductive zinc oxides had the following physical characteristics:

| Physical characteristics | Untreated ZnO | Treated ZnO |
|---|---|---|
| Particle size, microns | .319 | .358 |
| Brightness | 87.5 | 87.0 |
| Dispersed water absorption | 390 | 250 |
| Bulk density, lb. per cu. ft. | 22.37 | 73.71 |

The treated zinc oxide was densified and pelletized. The superior electrical characteristics of this photoconductive zinc oxide in aqueous and solvent electrophotographic recording members are illustrated in Table I.

EXAMPLE NO. 3

Fifty pounds of French process photoconductive zinc oxide, AZO-ZZZ-661, Lot 4-5086, was treated in an externally heated stainless steel rotary kiln undre the following conditions:

| | |
|---|---|
| Kiln temperature | 400° C. |
| Kiln r.p.m. | 15. |
| Air flow | Approx. 50 c.f.m. |
| Water vapor | Sufficient to saturate air at 70° F. |
| Retention time | 30 minutes. |

The treated and untreated photoconductive zinc oxides had the following physical characteristics:

| Physical characteristics | Untreated ZnO | Treated ZnO |
|---|---|---|
| Particle size, microns | .335 | .367 |
| Brightness | 87 | 87.5 |
| Dispersed water absorption | 490 | 260 |
| Bulk density, lb. per cu. ft. | 25.30 | 43.39 |

The product was densified and pelletized. The superior electrical characteristics of this photoconductive zinc oxide in aqueous and solvent electrophotographic recording members are illustrated in Table I.

It should be noted that in Examples 1 through 3 the temperatures were varied from 250° to 400° C. and the retention times were varied from 30 to 240 minutes. However, by selecting suitable combinations of temperature and time, the dispersed water absorption values of the three products were held within the range of 250 to 260.

EXAMPLE NO. 4

Fifty pounds of French process zinc oxide, AZO-ZZZ-661, Lot 4-5191, was treated in an externally-heated stainless steel rotary kiln under the following conditions:

| | |
|---|---|
| Kiln temperature | 575° C. |
| Kiln r.p.m. | 15. |
| Air flow | Approx. 50 c.f.m. |
| Water vapor | Sufficient to saturate air at 70° F. |
| Retention time | 60 minutes. |

The treated and untreated photoconductive zinc oxide had the following physical characteristics:

| Physical characteristics | Untreated ZnO | Treated ZnO |
|---|---|---|
| Particle size, microns | .339 | .370 |
| Brightness | 88 | 87.5 |
| Dispersed water absorption | 340 | 225 |
| Bulk density, lb. per cu. ft. | 22.26 | 42.48 |

The product was densified and pelletized. The lower dispersed water absorption caused by treatment at higher temperature and longer retention time is illustrated by this example. The modified but still very desirable electrical characteristics of this photoconductive zinc oxide in aqueous and solvent electrophotographic recording members are illustrated in Table I.

EXAMPLE NO. 5

Fifty pounds of French process zinc oxide, AZO-ZZZ-661, Lot 4-5738, was treated in an externally-heated stainless steel rotary kiln under the following conditions:

| | |
|---|---|
| Kiln temperature | 400° C. |
| Kiln r.p.m. | 15. |
| Air flow | Approx. 50 c.f.m. |
| Water vapor | Sufficient to saturate air at 70° F. |
| Carbon dioxide | Approx. 1 c.f.m. |
| Retention time | 30 minutes. |

The treated and untreated photoconductive zinc oxide had the following physical characteristics:

| Physical characteristics | Untreated ZnO | Treated ZnO |
|---|---|---|
| Particle size, microns | .348 | .351 |
| Brightness | 88 | 88 |
| Dispersed water absorption | 360 | 280 |
| Bulk density, lb. per cu. ft. | 23.6 | 54.2 |

The treated zinc oxide showed an increase in density and the product was completely pelletized. The decrease in electrical characteristics of this photoconductive zinc oxide due to the presence of 2 percent by volume carbon dioxide gas during treatment are illustrated (with Pliolite S-5B only) in Table I. However, the carbonated zinc oxide in the alkyd formulation caused the coating to thicken. In the aqueous formulation the carbonated zinc oxide precipitated the Parez 613 during the milling step, and the coating was worthless.

In the above five examples all kiln temperatures were measured using a chromel-alumel thermocouple which was placed in physical contact with the outside of the rotating drum at a position near the top of the drum. Measurements were made using a Leeds and Northrup K-2 potentiometric bridge with the thermocouple as the primary element.

EXAMPLE NO. 6

Three pounds of French process photoconductive zinc oxide, AZO-ZZZ-661, Lot 3-5728, was treated in a rotary kiln swept with a mixture of preheated air and steam. Zinc oxide was fed and discharged continuously.

Kiln temperature, midpoint, ° C. _____ 550
Kiln r.p.m. _____ 1.0
Air flow, approximately _____c.f.m__ .50
Steam flow, approximately _____c.f.m__ .12
Retention time, minutes _____ 60

The treated and untreated photoconductive oxides had the following physical characteristics:

| Physical characteristics | Untreated ZnO | Treated ZnO |
|---|---|---|
| Particle size, microns | .31 | .34 |
| Brightness | 88 | 88 |
| Dispersed water absorption | 380 | 320 |
| Bulk density, lb. per cu. ft | 28.96 | 57.91 |

The treated zinc oxide showed an increase in density, and the product was pelletized. As shown in Table I, the untreated and treated oxides were tested in an alkyd vehicle. The original oxide had become mildly carbonated in laboratory storage, and the treatment raised the charge acceptance but did not completely eliminate the background problem, i.e. the appearance of a fogged or grey field as distinguished from white.

EXAMPLE NO. 7

Three pounds of French process photoconductive zinc oxide, AZO-ZZZ-661, Lot 3-5728, was treated in a rotary kiln swept with a mixture of preheated air and steam. Zinc oxide was fed and discharged continuously.

Kiln temperature, midpoint, ° C. _____ 625
Kiln r.p.m. _____ 1.0
Air flow, approximately _____c.f.m__ 0.50
Steam flow, approximately _____c.f.m__ 0.12
Retention time, minutes _____ 60

The treated and untreated photoconductive oxides had the following physical characteristics:

| Physical characteristics | Untreated ZnO | Treated ZnO |
|---|---|---|
| Particle size, microns | .31 | .44 |
| Brightness | 88 | 88 |
| Dispersed water absorption | 380 | 250 |
| Bulk density, lb. per cu. ft | 28.96 | 43.82 |

The treated oxide showed an increase in density, and the product was pelletized. This oxide has acceptable properties for solvent system coatings and, because of its low dispersed water absorption value, it has superior properties for aqueous coatings. All background was eliminated at the higher temperature employed.

EXAMPLE NO. 8

Three pounds of photoconductive French process zinc oxide, AZO-ZZZ-661, Lot 3-5728, was treated in a fluid refiner. The fluidizing gas used was a mixture of preheated air and steam.

Temperature of fluid bed, ° C. _____ 500
Air flow, approximately _____c.f.m__ 0.50
Steam flow, approximately _____c.f.m__ 0.12
Retention time, minutes _____ 120

The treated and untreated photoconductive oxides had the following physical characteristics:

| Physical characteristics | Untreated ZnO | Treated ZnO |
|---|---|---|
| Particle size, microns | .31 | .37 |
| Brightness | 88 | 88 |
| Dispersed water absorption | 380 | 280 |
| Bulk density, lb. per cu. ft | 28.96 | 47.24 |

The treated zinc oxide showed a moderate increase in density, and a portion of the product was pelletized. The superior electrical qualities of a coating made with the treated oxide are shown in Table I.

EXAMPLE NO. 9

Three pounds of French process photoconductive zinc oxide, AZO-ZZZ-661, Lot 3-5679, was treated in a fluid refiner. The fluidizing gas used was preheated air, and water was injected at the bottom of the fluid bed.

Temperature of fluid bed, ° C. _____ 500
Air flow, approximately _____c.f.m__ 0.50
Water flow, approximately _____ml./min__ 8
Retention time, minutes _____ 120

The treated and untreated photoconductive oxides had the following physical characteristics:

| Physical characteristics | Untreated ZnO | Treated ZnO |
|---|---|---|
| Particle size, microns | .319 | .315 |
| Brightness | 87.5 | 87.5 |
| Dispersed water absorption | 390 | 300 |
| Bulk density, lb. per cu. ft | 22.37 | 32.4 |

The treated zinc oxide showed an increase in density, and a portion of the product was pelletized. The superior electrical qualities of a coating made with the treated oxide are shown in Table I.

EXAMPLE NO. 10

Three pounds of French process photoconductive zinc oxide, AZO-ZZZ-661, Lot 3-5679, was treated in a fluid refiner. The fluidizing gas used was preheated air, and water was injected at the bottom of the fluid bed.

Temperature of fluid bed, ° C. _____ 600
Air flow, approximately _____c.f.m__ 0.50
Water flow, approximately _____ml./min__ 8
Retention time _____minutes__ 120

The treated and untreated photoconductive oxides had the following physical characteristics:

| Physical characteristics | Untreated ZnO | Treated ZnO |
|---|---|---|
| Particle size, microns | .319 | .350 |
| Brightness | 87.5 | 87.5 |
| Dispersed water absorption | 390 | 240 |
| Bulk density, lb. per cu. ft | 22.37 | 37.8 |

The treated zinc oxide showed an increase in density, and a portion of the product was pelletized. The superior electrical qualities of a coating made with the treated oxide are shown in Table I.

TABLE NO. I.—PHOTOCONDUCTIVE PROPERTIES AS MEASURED BY ELECTRICAL TESTS,[1] RECORDING MEMBER NEGATIVE CORONA CHARGED, ALL COATINGS APPLIED TO TREATED PAPER SUBSTRATE

| Test | Zinc oxide lot No. | Maximum charge acceptance volts | Volts end of 20 sec. dark decay | Volts 1 sec. light | Residual volts | Print quality |
|---|---|---|---|---|---|---|
| Pliolite S-5B solvent system ||||||| 
| Original [2] | 3-5679 | 420 | 380 | 170 | 35 | V.G. |
| Do.[2] | 4-5086 | 400 | 375 | 160 | 40 | V.G. |
| Do.[2] | 4-5191 | 210 | 190 | 90 | 30 | V.G. |
| Do.[2] | 4-5617 | 280 | 240 | 100 | 20 | V.G. |
| Do.[2] | 4-5605 | 240 | 290 | 130 | 20 | V.G. |
| Do.[2] | 4-5738 | 430 | 350 | 150 | 25 | V.G. |
| Example 1 | 3-5679 | 465 | 360 | 125 | 20 | V.G. |
| Example 2 | 3-5679 | 365 | 320 | 140 | 35 | V.G. |
| Example 3 | 4-5086 | 380 | 305 | 120 | 30 | V.G. |
| Example 4 | 4-5191 | 265 | 240 | 125 | 35 | V.G. |
| Example 5 | 4-5738 | 340 | 260 | 110 | 20 | Good. |
| Example 9 | 3-5679 | 360 | 290 | 130 | 30 | V.G. |
| Example 10 | 3-5679 | 260 | 215 | 90 | 20 | V.G. |

TABLE NO. I.—PHOTOCONDUCTIVE PROPERTIES AS MEASURED BY ELECTRICAL TESTS,[1] RECORDING MEMBER NEGATIVE CORONA CHARGED, ALL COATINGS APPLIED TO TREATED PAPER SUBSTRATE

| Test | Zinc oxide lot No. | Maximum charge acceptance volts | Volts end of 20 sec. dark decay | Volts 1 sec. light | Residual volts | Print quality |
|---|---|---|---|---|---|---|
| Alkyd 72-64B solvent system | | | | | | |
| Original [2] | 3-5679 | 680 | 615 | 310 | 50 | V.G. |
| Do.[2] | 3-5728 | 500 | 445 | 190 | 30 | Background. |
| Do.[2] | 4-5086 | 670 | 615 | 320 | 75 | V.G. |
| Do.[2] | 4-5191 | 245 | 220 | 100 | 20 | V.G. |
| Do.[2] | 4-5617 | 410 | 360 | 280 | 35 | V.G. |
| Do.[2] | 4-5605 | 435 | 390 | 345 | 35 | V.G. |
| Example 1 | 3-5679 | 905 | 830 | 450 | 80 | Ex. |
| Example 2 | 3-5679 | 800 | 675 | 330 | 35 | Ex. |
| Example 3 | 4-5086 | 850 | 770 | 440 | 100 | Ex. |
| Example 4 | 4-5191 | 380 | 280 | 130 | 30 | Ex. |
| Example 6 | 3-5728 | 810 | 700 | 390 | 50 | Med. Bgd. |
| Example 7 | 3-5728 | 560 | 520 | 260 | 50 | V.G. |
| Example 8 | 3-5728 | 660 | 600 | 310 | 55 | Ex. |
| Example 9 | 3-5679 | 650 | 580 | 270 | 35 | Ex. |
| Example 10 | 3-5679 | 230 | 190 | 80 | 20 | Ex. |
| Piccotex-100 aqueous system | | | | | | |
| Original [2] | 4-5617 | | | | | Impracticable. |
| Do.[2] | 4-5605 | | | | | Do. |
| Example 1 | 3-5679 | 855 | 530 | 290 | 30 | V.G. |
| Example 2 | 3-5679 | 860 | 680 | 240 | 35 | V.G. |
| Example 3 | 4-5086 | 1,000+ | 810 | 450 | 30 | V.G. |
| Example 4 | 4-5191 | 630 | 480 | 250 | 25 | V.G. |
| Example 5 | 4-5738 | | | | | Impracticable. |

[1] The normal criteria for measuring the electrical properties include maximum charge acceptance, dark and light decay and residual voltage. A use test is then made by actually making a contact print on the recording member or by making a print in a commercial machine. Normally the prepared electrophotographic coating is drawn down with a wire-wound 1/4" diameter rod on a standard treated paper substrate at the desired coating weight. After drying, the coated sheets are put into a humidity cabinet and conditioned overnight at a relative humidity of 50% and a temperature of 27° C. After conditioning, the coated sheets are dark adapted for at least one hour. The electrical tests are then made in a dark room at 50% R.H. and 27° C. The coated sheet is charged for one minute at 40 microamperes ±5 microamperes with a negative corona discharge operating at six to ten thousand volts. Immediately after charging the coated sheet a standardized probe attached to a Keithley 610 electrometer and recording device is placed on the coated sheet. The surface voltage immediately registered by the Keithley electrometer is known as maximum charge acceptance. The coated sheet is allowed to discharge for twenty seconds in the dark. This voltage recorded at the end of twenty seconds is known as the voltage after twenty seconds dark decay. A light is then turned on (150 ft. candles at the coated surface), and the voltage recorded after one second of light is known as the light decay voltage. The light continues to discharge the surface voltage, and the residual voltage is recorded as point where a tangent intersects the straight part of the light decay curve. Several thousand of these electrophotographic electrical tests have been made on a wide variety of coatings; the tests can easily be duplicated by different operators at ±10 volts.

[2] Original photoconductive zinc oxide before treating by the process of this invention.

The treated zinc oxides produced in Examples 1 through 10 disperse very readily in water, making audible noises as the pellets explode. The aqueous coating compositions described above usually have a Hegman fineness of over 6 after stirring at high speed in an Osterizer for three minutes. The same fineness can be obtained by ball milling for one to one and one-half hours.

Having thus described the invention, what is claimed and desired to be secured by Letters Patent is:

1. The method of making a zinc oxide which is particularly suited to use in aqueous photoconductive coating compositions, comprising heating French process zinc oxide in a flowing stream of gas consisting essentially of air and water vapor in a time-temperature range of between about 5 minutes at 700° and 4 hours at 200° C., and thereupon permitting the zinc oxide to cool in air.

2. The method of claim 1 wherein the zinc oxide is treated in an externally heated rotary kiln.

3. The method of claim 1 wherein the zinc oxide is treated in a fluid refiner, the fluidizing gas being preheated air.

4. Zinc oxide particularly adapted to use in aqueous photoconductive coating compositions, said zinc oxide being formed by heating French process zinc oxide in a flowing stream of gas consisting essentially of air and water vapor in a time-temperature range of between about 5 minutes at 700° and 4 hours at 200° C., and thereupon permitting the zinc oxide to cool in air, said treated zinc oxide having a dispersed water absorption under 325.

5. The method of making a zinc oxide which is particularly suited to use in aqueous photoconductive coating compositions, comprising heating French process zinc oxide in a flowing stream of gas consisting essentially of air or oxygen, in the presence of water vapor, in a time-temperature range of between about 5 minutes at 700° and 4 hours at 200° C., and thereupon permitting the zinc oxide to cool in air.

References Cited

UNITED STATES PATENTS

| | | | |
|---|---|---|---|
| Re. 23,475 | 4/1952 | Calbeck | 23—148 |
| 1,355,904 | 10/1920 | McKee | 23—148 |
| 1,522,098 | 1/1925 | Breyer et al. | 22—148 |
| 1,921,591 | 8/1933 | Szidon | 23—148 XR |
| 2,386,300 | 10/1945 | Drennan et al. | 260—681.5 |
| 2,386,379 | 10/1945 | Wolk | 260—681.5 |
| 2,386,734 | 10/1945 | Wolk | 260—681.5 |
| 2,395,355 | 3/1946 | Soday | 260—681.5 |
| 2,727,808 | 12/1955 | Thomsen | 96—1.8 |
| 2,907,674 | 10/1959 | Metcalfe et al. | 96—1.7 |
| 2,920,344 | 1/1960 | Stirling | 23—313 XR |
| 2,979,402 | 4/1961 | Greig | 96—1.8 |
| 3,060,134 | 10/1962 | Elder et al. | 96—1.8 XR |
| 3,107,169 | 10/1963 | Bornarth | 96—1.8 |
| 3,228,115 | 1/1966 | Swanson et al. | 23—313 XR |

OSCAR R. VERTIZ, *Primary Examiner.*

H. S. MILLER, *Assistant Examiner.*

U.S. Cl. X.R.

23—313; 96—1.8

UNITED STATES PATENT OFFICE
CERTIFICATE OF CORRECTION

Patent No. 3,429,662                                                       February 25, 1969

Otto C. Klein et al.

It is certified that error appears in the above identified patent and that said Letters Patent are hereby corrected as shown below:

Column 2, lines 2 and 3, "formulation" should read -- formation --; line 67, "7000° C." should read -- 700° C. --. Column 3, line 55, cancel ", a flow of oxidizing gases and steam is used". Column 4, line 31, "Alkyl" should read -- Alkyd --; line 35, "6.20%" should read -- 62.0% --. Column 5, line 9, "Return" should read -- Retention --; line 37, "untrated" should read -- untreated --; line 54, "undre" should read -- under --. Column 10, lines 53 to 56, cancel

|           |         |                        |
|-----------|---------|------------------------|
| 2,386,300 | 10/1945 | Drennan et al. ----- 260-681.5 |
| 2,386,379 | 10/1945 | Wolk ---------------- 260-681.5 |
| 2,386,734 | 10/1945 | Wolk ---------------- 260-681.5 |
| 2,395,355 | 3/1946  | Soday --------------- 260-681.5 |

Signed and sealed this 31st day of March 1970.

(SEAL)
Attest:

EDWARD M. FLETCHER, JR.                                  WILLIAM E. SCHUYLER, JR.
Attesting Officer                                                Commissioner of Patents